US012282395B2

(12) United States Patent
Welshans et al.

(10) Patent No.: US 12,282,395 B2
(45) Date of Patent: Apr. 22, 2025

(54) METHODS, SYSTEMS, AND DEVICES FOR DATA RECOVERY AND BACKUP

(71) Applicant: The Vanguard Group, Inc., Valley Forge, PA (US)

(72) Inventors: Nathan G Welshans, Jersey Shore, PA (US); Timothy James Emrick, King of Prussia, PA (US); Ryan Michael Spatz, Reading, PA (US); John Edward Beck, Jr., Philadelphia, PA (US)

(73) Assignee: Vanguard Group, Inc., Valley Forge, PA (US)

( * ) Notice: Subject to any disclaimer, the term of this patent is extended or adjusted under 35 U.S.C. 154(b) by 92 days.

(21) Appl. No.: 18/119,722

(22) Filed: Mar. 9, 2023

(65) Prior Publication Data

US 2024/0303166 A1 Sep. 12, 2024

(51) Int. Cl.
*G06F 11/00* (2006.01)
*G06F 9/455* (2018.01)
*G06F 11/14* (2006.01)

(52) U.S. Cl.
CPC ...... *G06F 11/1469* (2013.01); *G06F 9/45558* (2013.01); *G06F 11/1464* (2013.01); *G06F 2009/45583* (2013.01); *G06F 2201/84* (2013.01)

(58) Field of Classification Search
None
See application file for complete search history.

(56) References Cited

U.S. PATENT DOCUMENTS

| 10,999,316 | B2* | 5/2021 | Raghunathan | G06F 3/0673 |
| 2016/0139836 | A1 | 5/2016 | Nallathambi et al. | |
| 2018/0196817 | A1 | 7/2018 | Maybee et al. | |
| 2022/0012134 | A1 | 1/2022 | Chatterjee et al. | |
| 2022/0138047 | A1* | 5/2022 | Aquino | G06F 3/0689 711/162 |
| 2024/0176713 | A1* | 5/2024 | Flynn | G06F 11/2094 |
| 2024/0256658 | A1* | 8/2024 | Madan | G06F 21/566 |

OTHER PUBLICATIONS

Google Scholar/Patents search—text refined (Year: 2024).*
Google Scholar/Patents search—text refined (Year: 2025).*
Extended European Search Report in counterpart European Patent Application No. 24162515.1 dated Nov. 25, 2024 (16 pages).

* cited by examiner

*Primary Examiner* — Christopher S McCarthy
(74) *Attorney, Agent, or Firm* — FINNEGAN, HENDERSON, FARABOW, GARRETT & DUNNER LLP

(57) ABSTRACT

A method and system for efficient data recovery via change block tracking and replication comprising storing data using secured and immutable storage snapshots from a plurality of first devices on a plurality of storage arrays via a first network path and a second network path, determining a condition of data loss, power loss, or a cyber compromise event, and based on determining the condition, instantiating recovery of data using the secured and immutable storage snapshots from the plurality storage arrays via a third network path.

39 Claims, 9 Drawing Sheets

METHODS, SYSTEMS, AND DEVICES FOR DATA RECOVERY AND BACKUP

TECHNICAL FIELD

The present disclosure relates to data recovery systems, ecosystems, platforms, methods, and ways in which such data recovery systems and methods may be enhanced and made more effective and efficient. In particular, the present disclosure relates to a method and system for efficient data recovery or a cyber vault expedited recovery system and method which reduces Recovery Time Objective (RTO) and provides greater granularity for Recovery Point Objective (RPO) while maintaining the protection of said data.

BACKGROUND

Data recovery systems, ecosystems, platforms, and methods allow for the recovery of data, which may prove especially vital in the event of a cybersecurity event, a destructive cybersecurity event, data loss, data corruption, power loss, data loss as a result of a power loss, and/or disaster. Such data recovery systems and methods may include expedited recovery systems that allow for such recovery of data during the aforementioned cybersecurity event, destructive cybersecurity event, data loss, data corruption, power loss, data loss as a result of a power loss, and/or disaster. Moreover, such data recovery systems and methods may include cyber vault designs and/or solutions that continuously replicate key data and allow for the ability to regain all access and functionality of critical data systems and information technology infrastructure following the aforementioned cybersecurity event, destructive cybersecurity event, data loss, data corruption, power loss, data loss as a result of a power loss, and/or disaster. To measure the effectiveness of such data recovery systems and methods, several parameters may be utilized, chief among them being Recovery Time Objective (RTO) and Recovery Point Objective (RPO).

Recovery Time Objective (RTO) refers to the duration of time or the amount of time that it takes for a business process and/or operation to continue following the event of an aforementioned cybersecurity event, destructive cybersecurity event, data loss, data corruption, power loss, data loss as a result of a power loss, and/or disaster, without incurring unacceptable consequences associated with the break in continuity. Typically, RTO is associated with downtime of services, applications, and/or processes, and allows a business operation to allocate resources based on an acceptable RTO. For example, if the RTO of a system is three hours, this means that the business process and/or operation may resume delivery of products and services and/or execution of activities in three hours following the event of the aforementioned cybersecurity event, destructive cybersecurity event, data loss, data corruption, power loss, data loss as a result of a power loss, and/or disaster, without incurring unacceptable consequences. Naturally, it is desired that the RTO be as close to zero as possible to ensure that the delivery of products and services and/or execution of activities will occur as quickly as possible following the event of the aforementioned cybersecurity event, destructive cybersecurity event, data loss, data corruption, power loss, data loss as a result of a power loss, and/or disaster. Such a decision of having the RTO be as close to zero as possible may, however, be limited by available resources. The RTO is generally associated with data recovery solutions as having the RTO be as close to zero as possible entails the refinement of the data recovery solutions so that such data recovery solutions can immediately recover the data in the event of the aforementioned cybersecurity event, destructive cybersecurity event, data loss, data corruption, power loss, data loss as a result of a power loss, and/or disaster.

Recovery Point Objective (RPO) refers to the maximum duration of time or the maximum amount of time that a business process and/or operation can operate following data loss associated with the event of an aforementioned cybersecurity event, destructive cybersecurity event, data loss, data corruption, power loss, data loss as a result of a power loss, and/or disaster, without incurring unacceptable consequences associated with the break in continuity. Typically, RPO is associated with the last performed data backup, data backup frequency, and the amount of time or data that a business process and/or operation is willing to lose after the aforementioned cybersecurity event, destructive cybersecurity event, data loss, data corruption, power loss, data loss as a result of a power loss, and/or disaster. For example, a database concerning financial transactions may require instantaneous backup of the data at the moment of an aforementioned cybersecurity event, destructive cybersecurity event, data loss, data corruption, power loss, data loss as a result of a power loss, and/or disaster, thereby requiring an RPO close to zero. However, a database for a software solution business may not require instantaneous backup of data in the event of an aforementioned cybersecurity event, destructive cybersecurity event, data loss, data corruption, power loss, data loss as a result of a power loss, and/or disaster, thereby allowing for an RPO of 24-48 hours. However, it is still desirable to have an RPO closer to zero. This may be achieved by ensuring the backup of the data to ensure that the business process and/or operation may continue operation in the event of data loss. Thus, the RPO is generally associated with backup data solutions as having the RPO be as close to zero as possible entails the refinement of the data backup solutions so that such data is immediately available to the business process and/or operation in the event of the aforementioned cybersecurity event, destructive cybersecurity event, data loss, data corruption, power loss, data loss as a result of a power loss, and/or disaster.

In many data recovery systems and methods, it is difficult to have a system with a low RTO, low RPO, and greater granularity, detail, and/or optionality as to the recovered data for RPO. Moreover, many existing data recovery systems and methods that utilize cyber vaulting designs tend to have longer RTO and do not allow for analysis, scrubbing and cleaning of the backed-up data which hinders the granularity, detail, and/or optionality of the recovered data for RPO. Moreover, current cyber vaulting designs limit their respective RPO by the data backup window. This leaves RPO granularity at best once per day and does allow for consistency between workloads.

Furthermore, data recovery systems associated with existing cyber vault designs and/or solutions tend to encapsulate the architecture associated with data production and the architecture associated with backup data within the same architecture to ensure the data is protected; however, this tends to provide a limited RTO and RPO. Also, this creates a dependency on data production storage systems and does not allow for a cloud-based backup solution. Moreover, current cyber vault designs and/or solutions allow for only the recovery of data and not the cleaning, scrubbing, and analysis of such data, if need be. Furthermore, in such cyber vault designs and/or solutions, RTO is limited by the throughput in which data can be moved from a recovery environment to the data production environment, meaning that RTO is limited by this movement of data.

Given this, there exists an overwhelming need for a data recovery system and method that provides for enhanced data recovery wherein the data may be cleaned, scrubbed, and analyzed as need be while ensuring a low RTO, a low RPO, and greater granularity, detail, and/or optionality as to the recovered data for RPO. Moreover, there is a strong need to provide such a solution in an architecture that is abstracted away from the actual data production storage systems, for example in a cloud-based backup solution, while ensuring that the data is adequately protected.

SUMMARY

Different from conventional solutions, the present disclosure solves the above problems by allowing for a data recovery system with a reduced RTO and RPO while also ensuring the deliverance of granular and detailed protected data to the system as need be. The present disclosure does so by decoupling the vault architecture of the data production environment from the backup environment or cyber recovery environment while ensuring speedy recovery of the data. Such decoupling also allows for flexibility and increases granularity and detail of the data RPO as the data may be delivered to a vault recovery environment or a virtual recovery environment for data cleaning, scrubbing, and analysis before and/or after being sent to the cyber recovery environment and/or data production environment, as need be. Moreover, such decoupling allows for the existence of a cloud-based data backup solution. Also, the present disclosure's storing of data via the use of storage snapshots allows for the immutability and safety of such stored data. In this manner, the present disclosure arrives at a solution at the intersection of data recovery and data backup. Such a solution enables a reduced RTO while also ensuring greater granularity, detail, and/or optionality as to the recovered immutable data for RPO. Moreover, the stored and recovered immutable data allows for the protection of such data.

In one embodiment, the present disclosure describes a method for efficient data recovery and backup comprising storing data using storage snapshots from a plurality of first devices on a plurality of storage arrays via a first network path and a second network path, determining a condition of data loss, power loss, or a cyber compromise event, and, based on determining the condition, instantiating recovery of data using the storage snapshots from the plurality of storage arrays via a third network path.

In a further embodiment, the plurality of first devices is associated with a data production environment and the plurality of storage arrays stores the data in a read-only manner to make the data immutable.

In yet a further embodiment, storing data using storage snapshots further comprises continuously sending the data from the plurality of first devices to a virtual or physical machine associated with a cyber recovery environment via the first network path, wherein the first network path comprises an air gapped first network medium and a control point. In a further embodiment, storing data using storage snapshots further comprises writing the data from the virtual or physical machine to the plurality of storage arrays via the second network path, wherein the second network path comprises a second network medium. In yet a further embodiment, storing data using storage snapshots further comprises utilizing the second network medium over a fiber medium to write the data from the virtual or physical machine to the logical unit number (LUN) of the data on the plurality of storage arrays.

In a further embodiment, instantiating recovery of data further comprises sending the data to the plurality of first devices via a pair of cyber recovery environment storage area network switches. In a further embodiment, instantiating recovery of data further comprises sending the data from the pair of cyber recovery environment storage area network switches to a pair of storage area network switches associated with one of the plurality of the first devices. In yet a further embodiment, instantiating recovery of data further comprises sending the data from the pair of cyber recovery environment storage area network switches to a pair of storage area network switches associated with another one of the plurality of the first devices.

In a further embodiment, instantiating recovery of data further comprises sending the data to a plurality of second devices for scrubbing, analysis, and cleaning. In yet a further embodiment, instantiating recovery of data further comprises sending the data to the plurality of second devices via the pair of cyber recovery environment storage area network switches to a pair of storage area network switches associated with one of the plurality of the second devices. In yet a further embodiment, instantiating recovery of data further comprises sending the data to the plurality of second devices via the pair of cyber recovery environment storage area network switches to a pair of storage area network switches associated with another one of the plurality of the second devices.

In another embodiment, the present disclosure describes a system comprising a memory storing instructions and a process configured to execute the instructions to perform operations comprising storing data using storage snapshots from a plurality of first devices on a plurality of storage arrays via a first network path and a second network path, determining a condition of data loss, power loss, or a cyber compromise event, and, based on determining the condition, instantiating recovery of data using the storage snapshots from the plurality of storage arrays via a third network path.

In a further embodiment, the plurality of first devices is associated with a data production environment and the system further comprises a cyber recovery environment comprising the plurality of storage arrays, a virtual or physical machine, and a pair of storage area network switches.

In yet a further embodiment, storing data using storage snapshots further comprises continuously sending the data from the plurality of first devices to the virtual or physical machine via the first network path, wherein the first network path comprises an air gapped ethernet network and a control point. In yet a further embodiment, storing data using storage snapshots further comprises utilizing the second network path over a fiber medium to write the data from the virtual or physical machine to the logical unit number (LUN) of the data on the plurality of storage arrays.

In a further embodiment, instantiating recovery of data further comprises sending the data from the pair of cyber recovery environment storage area network switches to a pair of storage area network switches associated with one of the plurality of the first devices.

In a further embodiment, instantiating recovery of data further comprises sending the data to a plurality of second devices for scrubbing, analysis, and cleaning. In still a further embodiment, instantiating recovery of data further comprises sending the data to the plurality of second devices via the pair of cyber recovery environment storage area network switches to a pair of storage area network switches associated with one of the plurality of the second devices.

BRIEF DESCRIPTION OF DRAWING(S)

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the present invention.

DETAILED DESCRIPTION

Reference will now be made in detail to exemplary embodiments, shown in the accompanying drawings.

Figure 1:
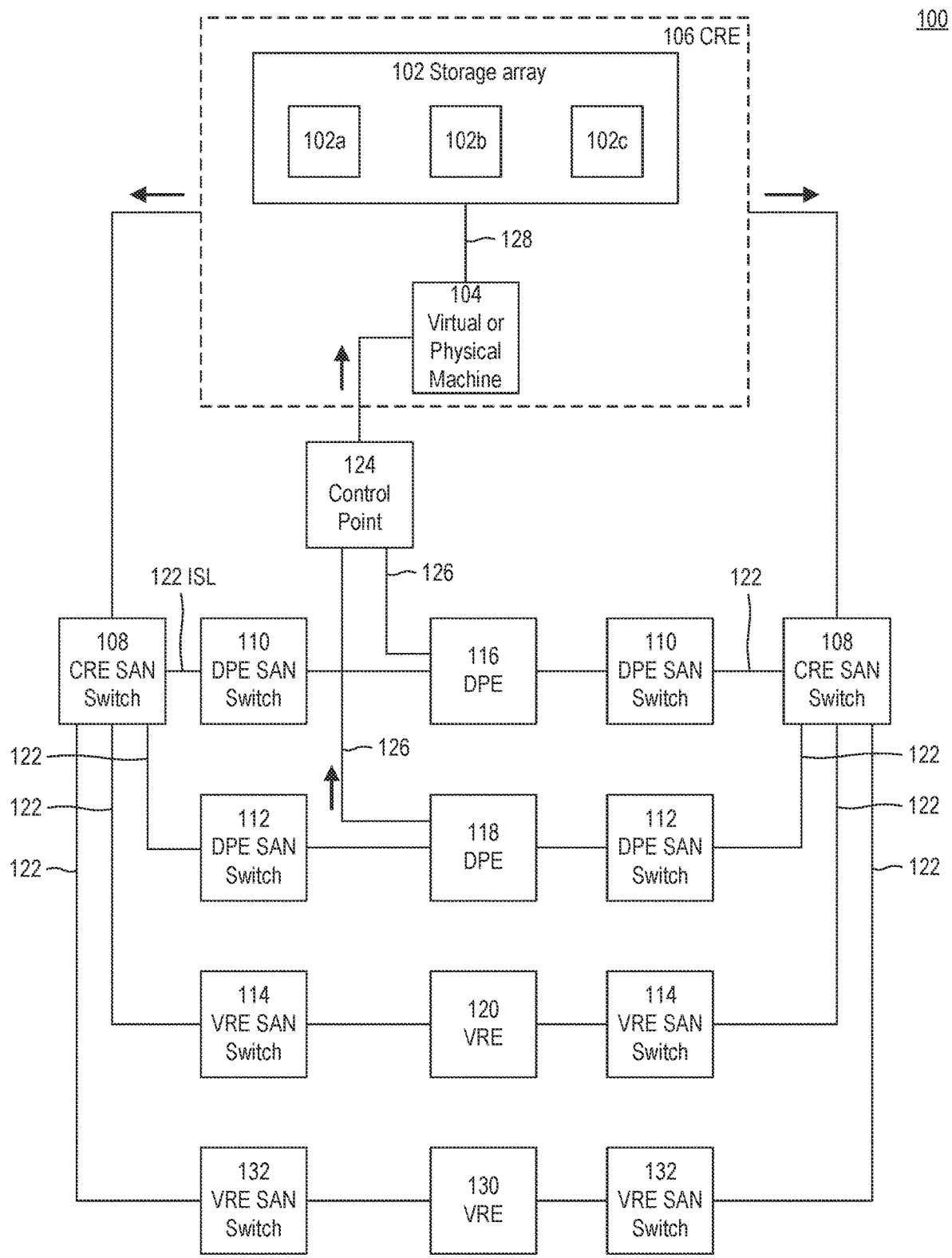
FIG. 1 illustrates a block diagram of an exemplary system for data recovery and backup comprising a cyber recovery environment (CRE), a data production environment (DPE), and a virtual recovery environment (VRE), consistent with disclosed embodiments.

FIG. 1 illustrates a block diagram of an exemplary system 100 for data recovery and backup, consistent with disclosed embodiments. System 100 may be configured to perform expedited data recovery and backup for a cyber vault consistent with disclosed embodiments, wherein the system 100 comprises a cyber recovery environment (CRE), a data production environment (DPE), and a virtual recovery environment (VRE).

As shown in FIG. 1, system 100 for data recovery and backup may include a storage array 102 comprising storage arrays 102a, 102b, and 102c, a virtual or physical machine 104, a cyber recovery environment (CRE) 106, a CRE storage area network (SAN) switch 108, a data production environment (DPE) storage area network (SAN) switch 110, a DPE storage area network (SAN) switch 112, a virtual recovery environment (VRE) storage area network (SAN) switch 114, a data production environment (DPE) device 116, a data production environment (DPE) device 118, a virtual recovery environment (VRE) device 120, an inter-switch Link (ISL) 122, a control point 124, a network 126, a medium 128, a virtual recovery environment (VRE) device 130, and a virtual recovery environment (VRE) storage area network (SAN) switch 132. In some embodiments, the system 100 may comprise one or more of each of the components depicted in FIG. 1. Moreover, the components and arrangements of the components included in system 100 may vary. Thus, system 100 may include other components that perform or assist in the performance of one or more processes consistent with the disclosed embodiments.

In some embodiments, the storage array 102 and/or the storage arrays 102a, 102b, and 102c may be implemented as one or more computer systems having at least one storage processor and at least one memory. In some embodiments, the storage array 102 and/or the storage arrays 102a, 102b, and 102c may be implemented as a device. In some embodiments, the storage array 102 and/or the storage arrays 102a, 102b, and 102c may be a data storage system used for cloud-based storage, file-based storage, or object storage. In some embodiments, the storage array 102 and/or the storage arrays 102a, 102b, and 102c may be a storage area network (SAN) and/or a storage area network (SAN) that may be a modular SAN array, a monolithic SAN array, and/or a utility storage array. In still other embodiments, the storage array 102 and/or the storage arrays 102a, 102b, and 102c may be a disk storage system which contains multiple disk drives, disk array controllers, and/or network attached storage (NAS). In some embodiments, the storage array 102 and/or the storage arrays 102a, 102b, and 102c may be implemented as data centers, data farms, and/or server farms. In still other embodiments, the storage array 102 and/or the storage arrays 102a, 102b, and 102c may be implemented as data farms that analyze, process, grow, and enrich the relevant data. In other embodiments, the storage array 102 and/or the storage arrays 102a, 102b, and 102c may be configured to store data, receive data, provide data, communicate data, and/or process data. In other embodiments, the storage array 102 and/or the storage arrays 102a, 102b, and 102c may be configured to store data using storage snapshots to create immutable snapshots. In other embodiments, the storage array 102 and/or the storage arrays 102a, 102b, and 102c may be configured to store data in a read-only matter to make the data immutable and, thus, protected. Additionally, the storage array 102 and/or the storage arrays 102a, 102b, and 102c may be associated with and/or a part of the cyber recovery environment (CRE) 106. Also, the storage array 102 and/or the storage arrays 102a, 102b, and 102c may utilize an inter-switch link (ISL) 122 to communicate between the devices and components of the system 100. Moreover, the system 100 determines size requirements for the storage array 102 and/or the storage arrays 102a, 102b, and 102c by procuring, analyzing, and determining primary data footprint, the change rate, and/or the data retention period of the system 100. Furthermore, the storage array 102 and/or the storage arrays 102a, 102b, and 102c may have security features that allow for immutable, secure snapshot(s) that may not be deleted and/or removed.

In some embodiments, the virtual or physical machine 104 may be implemented on one or more host computer systems wherein the host computer system(s) has least one processor and at least one memory. In some embodiments, the virtual or physical machine 104 may be a virtualization and/or emulation of a computer system. In some embodiments, the virtual or physical machine 104 may be implemented as a virtual device or an emulator. In still other embodiments, the virtual or physical machine 104 may be based on computer architectures and provides the functionality of a physical computer. In other embodiments, the virtual or physical machine 104 may be a system virtual machine that utilizes a hypervisor, a process virtual machine, a virtual machine emulator, and/or a machine that utilizes hardware-assisted virtualization. Moreover, the virtual or physical machine 104 may be associated with and/or a part of the cyber recovery environment (CRE) 106. Also, the virtual or physical machine 104 may store data incoming from the data production environment (DPE) device 116 and/or the data production environment (DPE) device 118. Furthermore, the virtual or physical machine 104 may utilize a fiber medium 128 to write the data from the virtual or physical machine 104 to the storage array 102 and/or the storage arrays 102a, 102b, and 102c.

In some embodiments, the cyber recovery environment (CRE) 106 may be implemented as one or more computer systems having at least one processor and at least one memory. In some embodiments, the cyber recovery environment (CRE) 106 may be implemented as a device. In some embodiments, the CRE 106 may further comprise the storage array 102 and/or the storage arrays 102a, 102b, and 102c, the virtual machine 104, and/or cyber recovery environment (CRE) storage area network (SAN) switches 108. In still other embodiments, the CRE 106 may store data incoming from the data production environment (DPE) device 116 and/or the data production environment (DPE) device 118. In other embodiments, CRE 106 may transfer the incoming data from the virtual or physical machine 104 to the storage array 102 and/or the storage arrays 102a, 102b, and 102c. In still other embodiments, the CRE 106 may instantiate recovery of the data by sending the data via the cyber recovery environment (CRE) storage area network (SAN) switches 108 to the data production environment (DPE) device 116, the data production environment (DPE) device 118, the virtual recovery environment (VRE) device 120, and/or the virtual recovery environment (VRE) device 130. Furthermore, the CRE 106 may utilize an inter-switch link (ISL) 122 to communicate between the devices and components of the system 100.

In some embodiments, the cyber recovery environment (CRE) storage area network (SAN) switch 108 may be implemented as a storage area network (SAN) switch. In other embodiments, the CRE storage area network (SAN) switch 108 may be a fiber-optic based switch. In further embodiments, the CRE storage area network (SAN) switch 108 may be implemented as a storage area network (SAN) switch that may be a Fibre Channel (FC) switch. In still other embodiments, the CRE storage area network (SAN) switch 108 may be a copper-based switch. In other embodiments, the cyber recovery environment (CRE) storage area network (SAN) switch 108 may be implemented as a local area network (LAN) switch. In other embodiments, the CRE storage area network (SAN) switch 108 may be implemented as a local area network (LAN) switch that may be an Ethernet switch. In still other embodiments, the CRE storage area network (SAN) switch 108 may be implemented as a host controller, a host adapter, and/or a host bus adapter (HBA). In other embodiments, the CRE storage area network (SAN) switch 108 may be implemented as a network interface controller (NIC), network adapter, local area network (LAN) adapter, a network interface card (NIC) and/or a physical network interface. In still other embodiments, the CRE storage area network (SAN) switch 108 may be implemented as a converged network adapter (CAN) and/or a converged network interface controller (C-NIC). Moreover, the CRE storage area network (SAN) switch 108 may form a part of the third network path that allows for instantiating recovery of data using the storage snapshots from the storage array 102 and/or the storage arrays 102a, 102b, and 102c. Furthermore, the cyber recovery environment (CRE) storage area network (SAN) switch 108 may utilize an inter-switch link (ISL) 122 to communicate between the devices and components of the system 100.

In some embodiments, each of the data production environment (DPE) storage area network (SAN) switch 110 and the data production environment (DPE) storage area network (SAN) switch 112 may be implemented as a storage area network (SAN) switch. In other embodiments, the DPE storage area network (SAN) switch 110 and the DPE storage area network (SAN) switch 112 may be a fiber-optic based switch. In further embodiments, the DPE storage area network (SAN) switch 110 and the DPE storage area network (SAN) switch 112 may be implemented as a storage area network (SAN) switch that may be a Fibre Channel (FC) switch. In still other embodiments, the DPE storage area network (SAN) switch 110 and the DPE storage area network (SAN) switch 112 may be a copper switch. In other embodiments, each of the DPE storage area network (SAN) switch 110 and the DPE storage area network (SAN) switch 112 may be implemented as a local area network (LAN) switch. In other embodiments, each of the DPE storage area network (SAN) switch 110 and the DPE storage area network (SAN) switch 112 may be implemented as a local area network (LAN) switch that may be an Ethernet switch. In still other embodiments, each of the DPE storage area network (SAN) switch 110 and the DPE storage area network (SAN) switch 112 may be implemented as a host controller, a host adapter, and/or a host bus adapter (HBA). In other embodiments, each of the DPE storage area network (SAN) switch 110 and DPE storage area network (SAN) switch 112 may be implemented as a network interface controller (NIC), network adapter, local area network (LAN) adapter, a network interface card (NIC) and/or a physical network interface. In still other embodiments, each of the DPE storage area network (SAN) switch 110 and the DPE storage area network (SAN) switch 112 may be implemented as a converged network adapter (CAN) and/or a converged network interface controller (C-NIC). Moreover, each of the DPE storage area network (SAN) switch 110 and the DPE storage area network (SAN) switch 112 may form a part of the third network path that allows for instantiating recovery of data using the storage snapshots from the storage array 102 and/or the storage arrays 102a, 102b, and 102c. Furthermore, each of the DPE storage area network (SAN) switch 110 and the DPE storage area network (SAN) switch 112 may utilize an inter-switch link 122 to communicate between the devices and components of the system 100.

In some embodiments, each of the virtual recovery environment (VRE) storage area network (SAN) switch 114 and the virtual recovery environment (VRE) storage area network (SAN) switch 132 may be implemented as a storage area network (SAN) switch. In other embodiments, the virtual recovery environment (VRE) storage area network (SAN) switch 114 and the virtual recovery environment (VRE) storage area network (SAN) switch 132 may be a fiber-optic based switch. In further embodiments, the virtual recovery environment (VRE) storage area network (SAN)

switch 114 and the virtual recovery environment (VRE) storage area network (SAN) switch 132 may be implemented as a storage area network (SAN) switch that may be a Fibre Channel (FC) switch. In still other embodiments, the virtual recovery environment (VRE) storage area network (SAN) switch 114 and the virtual recovery environment (VRE) storage area network (SAN) switch 132 may be a copper switch. In still other embodiments, each of the VRE storage area network (SAN) switch 114 and the VRE storage area network (SAN) switch 132 may be implemented as a storage area network (SAN) switch that may be a Fibre Channel (FC) switch. In other embodiments, each of the VRE storage area network (SAN) switch 114 and the VRE storage area network (SAN) switch 132 may be implemented as a local area network (LAN) switch. In other embodiments, each of the VRE storage area network (SAN) switch 114 and the VRE storage area network (SAN) switch 132 may be implemented as a local area network (LAN) switch that may be an Ethernet switch. In still other embodiments, each of the VRE storage area network (SAN) switch 114 and the VRE storage area network (SAN) switch 132 may be implemented as a host controller, a host adapter, and/or a host bus adapter (HBA). In other embodiments, each of the VRE storage area network (SAN) switch 114 and the VRE storage area network (SAN) switch 132 may be implemented as a network interface controller (NIC), network adapter, local area network (LAN) adapter, a network interface card (NIC) and/or a physical network interface. In still other embodiments, each of the VRE storage area network (SAN) switch 114 and the VRE storage area network (SAN) switch 132 may be implemented as a converged network adapter (CAN) and/or a converged network interface controller (C-NIC). Moreover, each of the VRE storage area network (SAN) switch 114 and the VRE storage area network (SAN) switch 132 may form a part of the third network path that allows for instantiating recovery of data using the storage snapshots from the storage array 102 and/or the storage arrays 102a, 102b, and 102c. Furthermore, each of the VRE storage area network (SAN) switch 114 and the VRE storage area network (SAN) switch 132 may utilize an inter-switch link 122 to communicate between the devices and components of the system 100.

In some embodiments, the data production environment (DPE) device 116 and the data production environment (DPE) device 118 may represent a plurality of first devices 116, 118. In some embodiments, each of the DPE device 116 and the DPE device 118 may be implemented as one or more computer systems having at least one processor and at least one memory. In other embodiments, each of the DPE device 116 and the DPE device 118 may be implemented as a hyperconverged infrastructure (HCI) that may further comprise a software-defined, unified system that combines all the elements of a traditional data center including storage, computing, networking, and management. In still other embodiments, each of the DPE device 116 and the DPE device 118 may be active data center devices that are a part of an overarching computing system 100, wherein the overarching computing system 100 may be an Information Technology infrastructure system. In some embodiments, each of the DPE device 116 and the DPE device 118 may be configured to store data, receive data, provide data, communicate data, analyze data, and/or process data. Moreover, each of the DPE device 116 and the DPE device 118 may be configured to allow for data backup and/or data transferal by sending data to the cyber recovery environment (CRE) 106 via the first network path 124, 126 and the second network path 128. Furthermore, each of the DPE device 116 and the DPE device 118 may be configured to receive recovered data and/or a recovery of data using storage snapshots arriving from the storage array 102 and/or the storage arrays 102a, 102b, and 102c via the third network path 108, 122, 110, 112, 114, 132. Also, each of the DPE device 116 and the DPE device 118 may utilize an inter-switch link 122 to communicate between the devices and components of the system 100.

In some embodiments, the virtual recovery environment (VRE) device 120 and the virtual recovery environment (VRE) device 130 may represent a plurality of second devices 120, 130. In some embodiments, each of the VRE device 120 and the VRE device 130 may be implemented as one or more computer systems having at least one processor and at least one memory. In other embodiments, each of the VRE device 120 and the VRE device 130 may be implemented as a hyperconverged infrastructure (HCI) that may further comprise a software-defined, unified system that combines all the elements of a traditional data center including storage, computing, networking, and management. In still other embodiments, each of the VRE device 120 and the VRE device 130 may be data centers that are a part of an overarching computing system 100, wherein the overarching computing system 100 may be an Information Technology infrastructure system. In some embodiments, each of the VRE device 120 and the VRE device 130 may be configured to store data, receive data, provide data, communicate data, analyze data, and/or process data. Moreover, each of the VRE device 120 and the VRE device 130 may be configured to allow for data transferal and/or data backup by sending data to the cyber recovery environment (CRE) 106 via the first network path 124, 126 and the second network path 128. Moreover, each of the VRE device 120 and the VRE device 130 may be configured to allow for data backup and/or data transferal by sending data to the cyber recovery environment (CRE) 106 via the first network path 124, 126 and the second network path 128. Also, each of the VRE device 120 and the VRE device 130 may be configured to allow for forensic analysis, scrubbing, and cleaning of data prior to sending the data for backup via the first network path 124, 126 and the second network path 128. Furthermore, each of the VRE device 120 and the VRE device 130 may be configured to receive recovered data and/or a recovery of data using storage snapshots arriving from the storage array 102 and/or the storage arrays 102a, 102b, and 102c via the third network path 108, 122, 110, 112, 114, 132. Also, each of the VRE device 120 and the VRE device 130 may utilize an inter-switch link 122 to communicate between the devices and components of the system 100.

In some embodiments, the inter-switch link 122 exists between all the devices and components of the system 100. In some embodiments, the inter-switch link 122 may be implemented upon one or more computer systems having at least one processor and at least one memory. In some embodiments, the inter-switch link 122 may be implemented upon a device and/or a medium. In some embodiments, such a medium may be a fiber-based optic medium. In some embodiments, the inter-switch link 122 may be software implemented on a device. In still other embodiments, the inter-switch link 122 may connect all the components and devices of the system 100. In some embodiments, the inter-switch link 122 may allow for the sharing of data between each of the components and devices of the system 100. Each of the connecting lines between the various component(s) and/or device(s) in FIG. 1 may each comprise its own inter-switch link 122 that allows for such communication. In still other embodiments, there may be an overarching common inter-switch link 122 that connects the various component(s) and/or device(s) of the system 100 together. Moreover, the use of the inter-switch links 122 provides a control point to segment between the various environments, as shown in FIG. 1. The use of the inter-switch links 122 may also allow for a modular scaling capability of the system 100. Furthermore, the use of the inter-switch links 122 reduces and/or allows for lower RTO for the system 100 by allowing for immediate access to the protected data and immediate vault protection upon data recovery.

In some embodiments, the control point 124 may be implemented as a control switch 124. In some embodiments, the control device 124 may be implemented as one or more computer systems having at least one processor and at least one memory. In some embodiments, the control point 124 may be a device. In some embodiments, the control point 124 may be software implemented on a device. Moreover, the control point 124 may form a part of the first network path that allows for storing of data from the plurality of first devices 116, 118 and/or the plurality of second devices 120, 130 to the storage array 102 and/or the storage arrays 102a, 102b, and 102c via the virtual or physical machine 104. In the event of a compromise, cybersecurity event, destructive cybersecurity event, data loss, data corruption, power loss, data loss due to or as a result of a power loss, disaster, repair requirements, and/or user(s) requirement(s) and/or initiative(s), the control point 124 may be used to prevent data backup and/or data transferal from the DPE devices 116, 118 and/or the VRE devices 120, 130.

In some embodiments, the network 126 may be any type of network that provides communication, exchanges information, and/or facilitates the exchange of information between components of the system 100. For example, in some embodiments, the network 126 may comprise a wired or wireless network. In still other embodiments, network 126 may be the internet, intranet, a Wide Area Network (WAN), a Storage Area Network (SAN), a Metropolitan Area Network (MAN), Near Field Communication (NFC), and/or any other suitable connection(s) configured to communicate data and enable the sending and receiving of information between the devices and components of the system 100. In still other embodiments, the network 126 may be an air gapped ethernet network 126. In other embodiments, the network 126 may be implemented upon a fiber-optic based medium or a fibre channel protocol (FCP). Moreover, the network 126 may form a part of the first network path 124, 126 that allows for storing of data from the plurality of first devices 116, 118 and/or the plurality of second devices 120, 130 to the storage array 102 and/or the storage arrays 102a, 102b, and 102c via the virtual or physical machine 104.

In some embodiments, the medium 128 may be any type of medium that provides communication, exchanges information, and/or facilitates the exchange of information between components of the system 100. For example, the medium 128 may be a fiber medium, a fiber-based medium, a fiber-optic based medium, an electric medium, a laser medium, and/or any suitable medium configured to communicate data and enable the sending and receiving of information between the devices and components of the system 100. Moreover, the medium 128 may form a part of the second network path 128 that allows for storing of data from the plurality of first devices 116, 118 and/or the plurality of second devices 120, 130 to the storage array 102 and/or the storage arrays 102a, 102b, and 102c via the virtual or physical machine 104. The system 100's cyber recovery environment 106 stores and/or transfers data by writing data from the virtual or physical machine 104 to the logical unit number (LUN) of the data on the storage arrays 102a, 102b, and 102c, wherein such writing and communication occurs via the medium 128.

Moreover, as seen in FIG. 1, system 100 brings all components together, including the cyber recovery environment (CRE) 106, the data production environment (DPE) 114, 116, and the virtual recovery environment (VRE) 120, 130, to allow for an expedited data recovery and data backup for a data recovery system and/or a cyber vault. The system 100 allows for a block replication solution and/or a block replication data backup from each of the data production environment (DPE) device 116, the data production environment (DPE) device 118, the virtual recovery environment (VRE) device 120, and the virtual recovery environment (VRE) device 130. Note that each of the data production environment (DPE) devices 116, 118 may comprise a plurality of first devices 116, 118 and each of the virtual recovery environment (VRE) devices 120, 130 may comprise a plurality of second devices 120, 130.

As can be further seen in FIG. 1, the arrows indicate that the system 100 continuously gathers, replicates, sends, and stores data from each of the aforementioned plurality of first devices 116, 118 and plurality of second devices 120, 130 via the inter-switch link (ISL) 122 and the first network path 124, 126 to the virtual or physical machine 104 in the cyber recovery environment (CRE) 106. In certain embodiments, the first network path 124,126 that allows for such data replication may comprise a control point 124 and an air gapped ethernet network 126. Moreover, the system 100 stores the data in the virtual or physical machine 104 via the use of secured storage snapshot(s), thereby ensuring the immutability of the stored data and, thus, the protection of the stored block of data from any mutability or modifications. Thereafter, the system 100 writes the stored data from the virtual or physical machine 104 to the storage array 102 and/or the storage arrays 102a, 102b, and 102c via the second network path 128. In some embodiments, the second network path 128 may utilize a second network medium such as a fiber medium to write the data from the virtual or physical machine 104 to the logical unit number (LUN) of the data on the storage array 102 and/or the storage arrays 102a, 102b, and 102c. The system 100's backup of data in this manner wherein a data storage array with snapshot capabilities is backed up allows for the protection of the data via the use of the secured snapshots. Moreover, the system 100's backup of data also allows for a lower RTO recovery given the use of the fiber medium 128. Furthermore, by writing the data from the virtual or physical machine 104 to the logical unit number (LUN) of the data on the storage array 102 and/or the storage arrays 102a, 102b, and 102c, the system 100 does not require the movement of the source data itself-only the necessary updating of the logical unit number (LUN) of the data. In some embodiments, the LUN of the data is a unique identifier to identify the data associated with the storage area network. Here, the system 100 unmounts the logical unit number (LUN) of the data from the virtual or physical machine 104. Thereafter, the system 100 transfers and mounts that same logical unit number (LUN) of the data on the storage array 102 and/or the storage arrays 102a, 102b, and 102c. This causes the storage array 102 and/or the storage arrays 102a, 102b, and 102c to call, identify, and/or have access to the pertinent data. As such, the system 100 transfers the data without moving the source data itself, but by updating and moving the logical unit number (LUN) of the data as described above. The system 100's ability to do this aids tremendously in lowering RTO and saving storage and data movement resources.

As can be further seen in FIG. 1, the arrows exiting the cyber recovery environment (CRE) 106 indicate the recovery of data from the CRE 106 to the plurality of first devices 116, 118 and to the plurality of second devices 120, 130. In the event of such a recovery of data from the CRE 106, which may be triggered by one or more of a condition of a compromise, data loss, data corruption, power loss, data loss as a result of power loss, a cyber compromise event, a cybersecurity event, a destructive cybersecurity event, a disaster, repair requirements, a user requirement, command, instruction, or initiatives, or other situations understood by one of skill in the art, the system 100 creates a read/write enabled storage snapshot from the desired storage snapshot and sends it to either the plurality of first devices 116, 118 and/or the plurality of second devices 120, 130. To do so, system 100 instantiates recovery of data by sending the storage snapshots from the storage array 102 and/or the plurality of storage arrays 102a, 102b, 102c via the third network path 108, 122, 110, 112, 114, 132. As seen in FIG. 1, the system 100 sends the recovered data to the third network path's cyber recovery environment (CRE) storage area network (SAN) switch 108. Thereafter, the system 100 utilizes the inter-switch link (ISL) 122 to send the storage snapshot to either the data production environment (DPE) storage area network (SAN) switch 110, the data production environment (DPE) storage area network (SAN) switch 112, the virtual recovery environment (VRE) storage area network (SAN) switch 114, and/or virtual recovery environment (VRE) storage area network (SAN) switch 132. Depending on which storage area network (SAN) switch the storage snapshot is sent to, the system 100 delivers the respective storage snapshot to either the first device 116, the first device 118, the second device 120, and/or the second device 130, respectively, as seen in FIG. 1.

The system 100's cyber recovery environment 106 creates the storage snapshots from the storage array 102 or the plurality of storage arrays 102a, 102b, and 102c. By taking secured snapshots of the relevant data, the cyber recovery environment 106 ensures that protected data is sent to either the DPE devices 116, 118 and/or the VRE devices 120, 130. Moreover, the system 100 may automate the creation of storage snapshots from the storage array 102 or the plurality of storage arrays 102a, 102b, and 102c by allowing for regularly-scheduled storage snaps. Additionally, the system 100 may allow for time-indexed storage snapshots from the storage array 102 or the plurality of storage arrays 102a, 102b, and 102c accordingly. Furthermore, the system 100 may have security features embedded in the storage array 102 and/or the storage arrays 102a, 102b, and 102c that allow for immutable, secure snapshot(s) that may not be deleted and/or removed.

As explained above, when the system 100 sends the storage snapshot to the either the data production environment (DPE) device 116 and/or the data production environment (DPE) device 118, the system 100's data production environment (DPE)'s plurality of first devices 116, 118 may store data, receive data, provide data, communicate data, analyze data, and/or process data.

When the system 100 sends the storage snapshot to either the virtual recovery environment (VRE) device 120 or the virtual recovery environment (VRE) device 130, the system 100's virtual recovery environment's (VRE) plurality of second devices 120, 130 may allow for forensic analysis, scrubbing, and cleaning of data prior to sending the data for backup via the first network path 124, 126 and the second network path 128. Doing so may enhance RPO by allowing greater granularity, detail, and/or optionality as to the recovered data.

Figure 2:
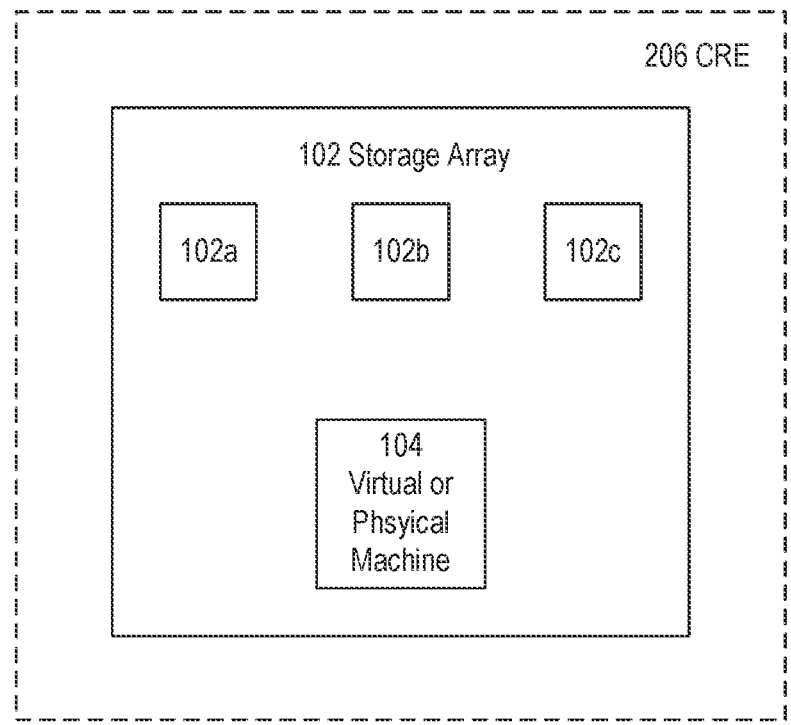
FIG. 2 illustrates a block diagram of an alternative for the cyber recovery environment (CRE) of the system 100, consistent with disclosed embodiments.

FIG. 2 illustrates a block diagram of an alternative for the cyber recovery environment (CRE) 206 of the system 100, consistent with disclosed embodiments. As seen in FIG. 2, the cyber recovery environment (CRE) 206 may comprise a storage array 102 wherein the storage array 102 further comprises a storage arrays 102a, 102b, and 102c and a virtual or physical machine 104. In FIG. 2, the storage array 102 encapsulates the virtual or physical machine 104. Here, the system 100 writes the stored data from the virtual or physical machine 104 to the storage arrays 102a, 102b, and 102c via the second network path 128, in a similar manner as described above. Nevertheless, FIG. 2 allows for an alternative structural arrangement for the cyber recovery environment (CRE) 206 wherein the storage array 102 encapsulates the virtual or physical machine 104. Such a structural arrangement may be beneficial in certain conditions and/or situations. For example, the encapsulation of the virtual or physical machine 104 within the storage array 102 allows for an added protective barrier between the virtual or physical machine 104 and elements outside the system 100. Given the virtual or physical machine's 104 access to data backup and/or data transferal from the DPE devices 116, 118 and the VRE devices 120, 130, such an added protective barrier may prove warranted in the event of a compromise, data loss, data corruption, power loss, data loss as a result of a power loss, disaster, and/or cybersecurity threat. Also, the encapsulation of the virtual or physical machine 104 within the storage array 102 negates the need for a medium for data transferal thereby allowing for the seamless transition of data between the virtual or physical machine 104 and the storage arrays 102a, 102b, and 102c. This further enhances the speed of data transferal in the CRE 206, which may prove vital when the system 100 may be employed by high-security systems associated with financial, banking, military, and/or government institutions, among others.

Figure 3:
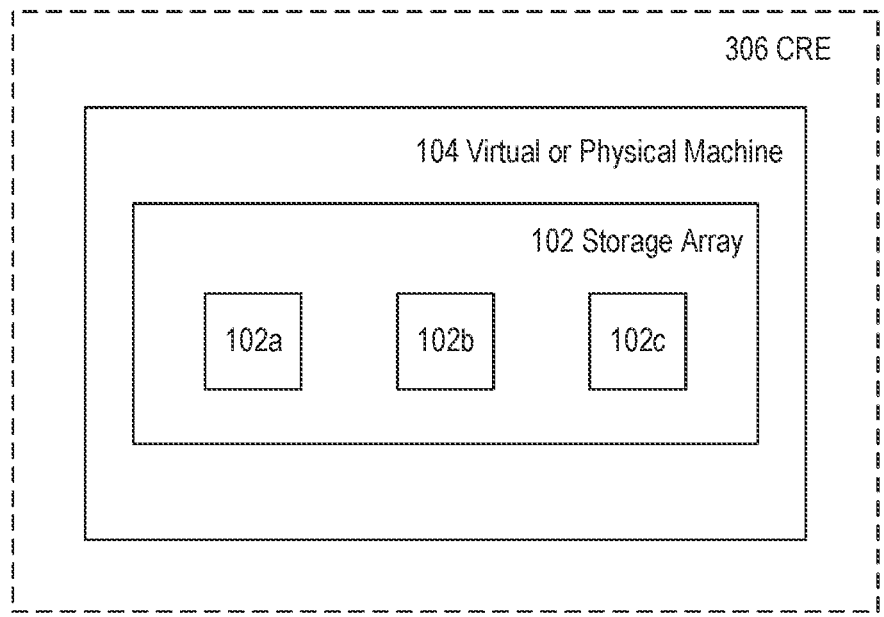
FIG. 3 illustrates a block diagram of an alternative for the cyber recovery environment (CRE) of the system 100, consistent with disclosed embodiments.

FIG. 3 illustrates a block diagram of an alternative for the cyber recovery environment (CRE) 306 of the system 100, consistent with disclosed embodiments. As seen in FIG. 3, the cyber recovery environment (CRE) 306 may comprise a storage array 102 wherein the storage array 102 further comprises a storage arrays 102a, 102b, and 102c and a virtual or physical machine 104. In FIG. 3, the virtual or physical machine 104 encapsules the storage array 102. Here, the system 100 writes the stored data from the virtual or physical machine 104 to the storage arrays 102a, 102b, and 102c via the second network path 128, in a similar manner as described above. Nevertheless, FIG. 3 allows for an alternative structural arrangement for the cyber recovery environment (CRE) 306 wherein the virtual or physical machine 104 encapsulates the storage array 102. Such a structural arrangement may be beneficial in certain conditions and/or situations. Here, the encapsulation of the storage array 102 by the virtual or physical machine 104 allows for the virtualization of the storage array 102. Such virtualization allows for portability, easier and faster access to the data stored within the storage array 102, better resource allocation, and/or versatility. Moreover, the encapsulation of the storage array 102 by the virtual or physical machine 104 negates the need for a medium for data transferal thereby allowing for the seamless transition of data between the virtual or physical machine 104 and the storage array 102. This further enhances the speed of data transferal in the CRE 306, which may prove vital when the system 100 may be employed by high-security systems associated with financial, banking, military, and/or government institutions, among others.

Figure 4:
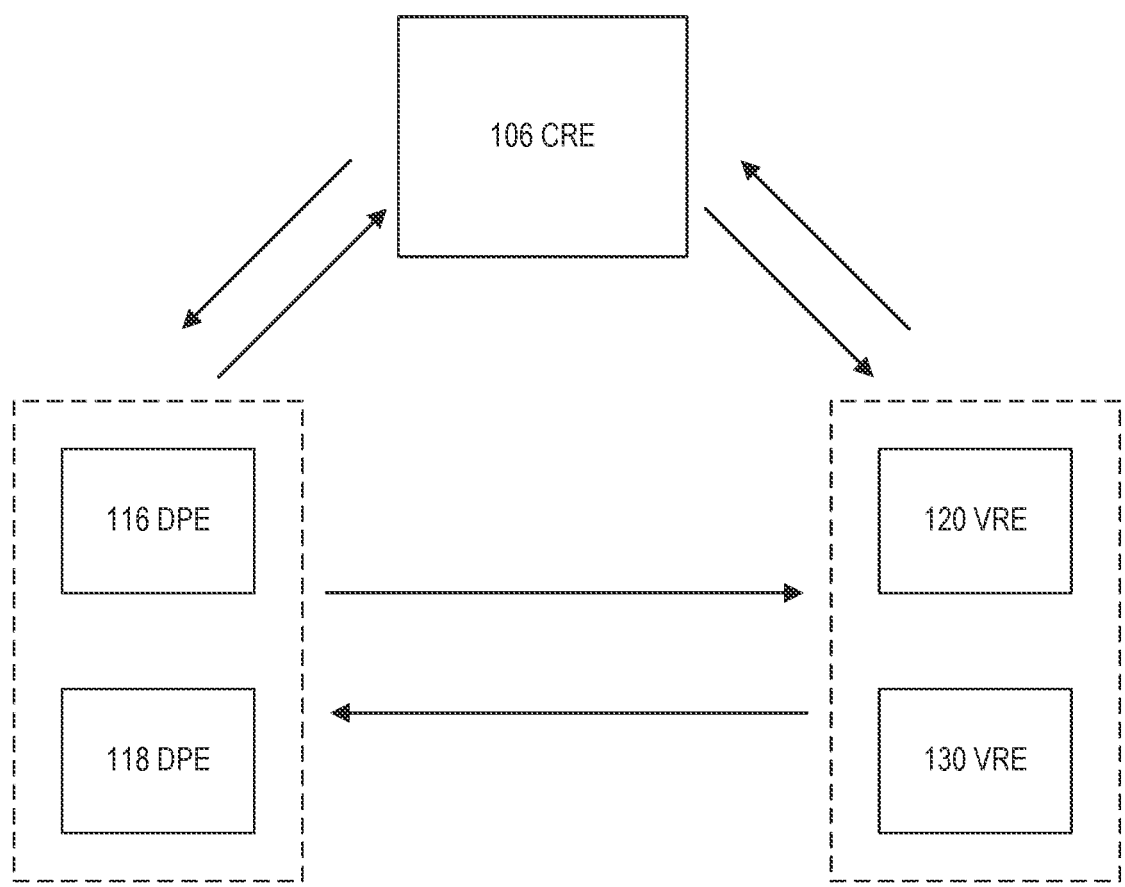
FIG. 4 illustrates a block diagram of an alternative exemplary system for data recovery and backup comprising a cyber recovery environment (CRE), a data production environment (DPE), and a virtual recovery environment (VRE), consistent with disclosed embodiments.

FIG. 4 illustrates a block diagram of an alternative exemplary system 400 for data recovery and backup wherein the system 400 allows for a back and forth and dynamic communication between the cyber recovery environment (CRE), the data production environment (DPE), and the virtual recover environment (VRE), consistent with disclosed embodiments. It is noted that, apart from the structural particularities of FIG. 4, the system 400 of FIG. 4 is otherwise analogous to the system 100 of FIG. 1, with similar structure(s) and function(s). Therefore, all the discussion above pertaining to system 100 above applies to system 400. However, as seen in FIG. 4, the system 400 for data recovery and backup allows for dynamic and two-way communication (as indicated by the two arrows) between each of the cyber recovery environment (CRE) 106, the data production environment (DPE) devices 116, 118, and the virtual recovery environment (VRE) devices 120, 130.

Such a structural arrangement allows for dynamic engagement and communication between each of the components of system 400, a feature that may be beneficial in certain conditions and/or situations. For example, FIG. 4 allows for back-and-forth communication between the DPE devices 116, 118 and the VRE devices 120, 130. Such communication allows for the continuous cleaning, analysis, and/or scrubbing of data associated with the DPE devices 116, 118 by the VRE devices 120, 130. This may prove beneficial in systems that require continuous data scrubbing and/or data cleansing, especially systems in high-stakes environment such as banking, trading, financial, banking, and/or government institutions, among others.

Figure 5:
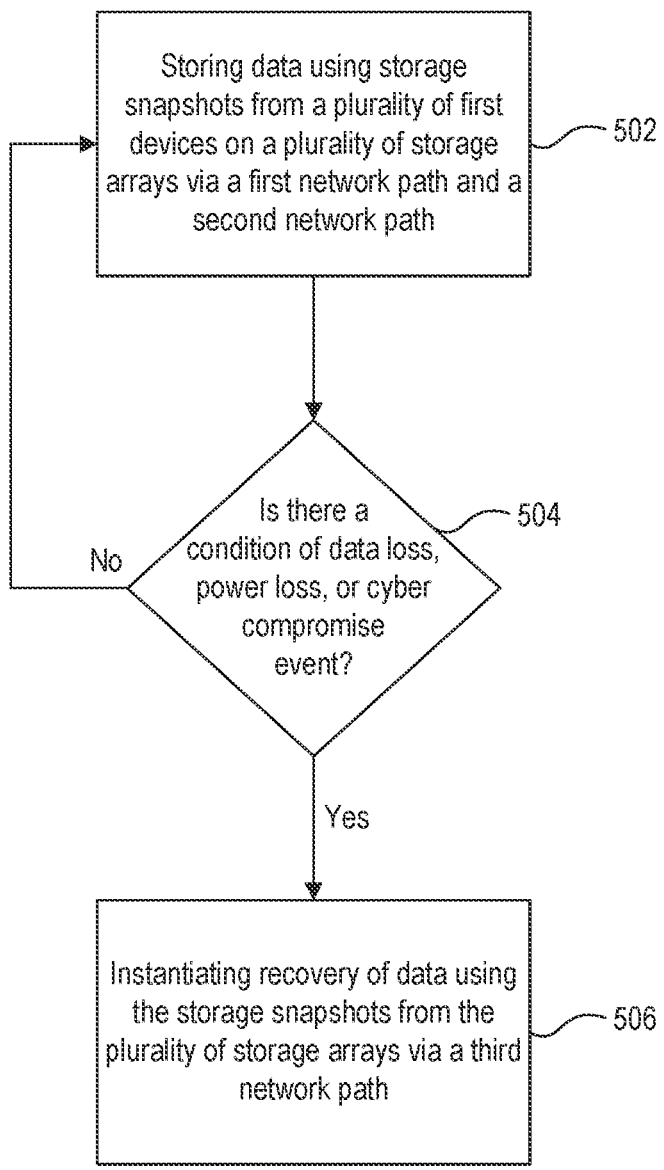
FIG. 5 illustrates a flowchart of an exemplary data recovery and backup process, consistent with disclosed embodiments.

FIG. 5 illustrates a flowchart of an exemplary data recovery and backup process, consistent with disclosed embodiments. The system 100 may carry out the data recovery and backup process of FIG. 5.

As seen in FIG. 5, in block 502, in some embodiments, the cyber recovery environment 106 stores data using storage snapshots from a plurality of first devices 116, 118 on a plurality of storage arrays 102a, 102b, 102c via the first network path 124, 126 and the second network path 128.

In block 504, the cyber recovery environment 106 determines whether there exists a condition (including, for example, data loss, power loss, or a cyber compromise event). This includes, for example, determining whether a condition exists (e.g., by reviewing log data or other information) or receiving an indication that a condition exists (e.g., by receiving a message or input from a human operator). If such a condition does not exist, the cyber recovery environment 106 returns to block 502. If, however, such a condition does exist, the system 100 proceeds to block 506.

In block 506, the cyber recovery environment 106 instantiates recovery of data using the storage snapshots from the plurality of storage arrays 102a, 102b, 102c via the third network path 108, 122, 110, 112, 114, 132. For example, as seen in FIG. 1, the cyber recovery environment 106 transfers the storage snapshots via the pair of CRE storage area network switches 108 to either the first device 116 via the DPE storage area network switch 110, the first device 118 via the DPE storage area network switch 112, the second device 120 via the VRE storage area network switch 114, and/or the second device 130 via the VRE storage area network switch 132.

Figure 6:
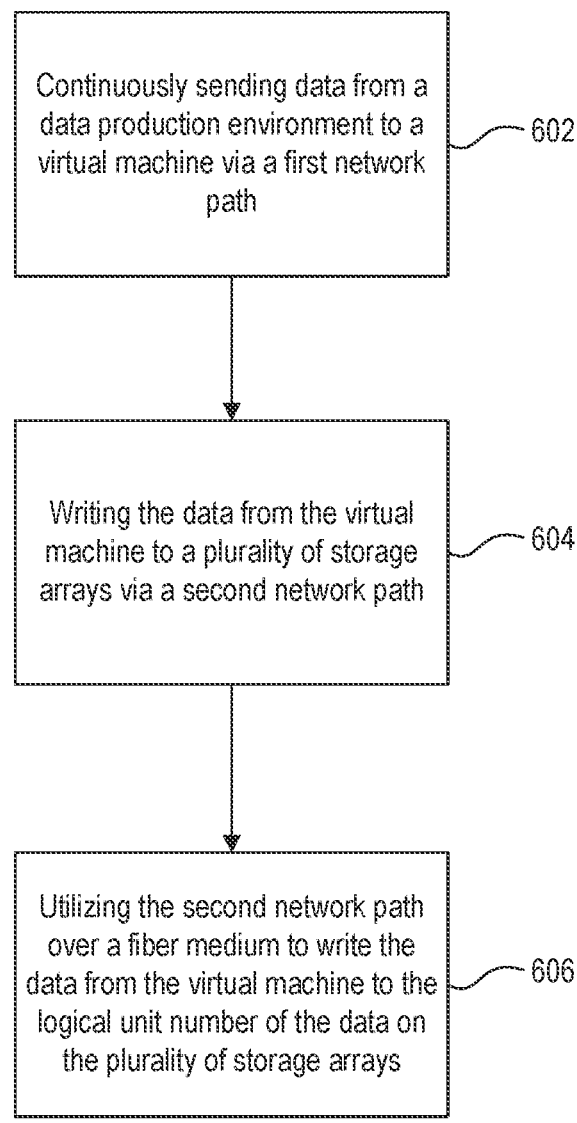
FIG. 6 illustrates a flowchart of an exemplary storing data using storage snapshots process, consistent with disclosed embodiments.

FIG. 6 illustrates a flowchart of an exemplary storing data using storage snapshots process, consistent with disclosed embodiments. The system 100 may carry out the storing data using storage snapshots process of FIG. 6.

As seen in FIG. 6, in block 602, the cyber recovery environment 106 continuously sends data from the data production environment 116, 118 to the virtual machine 104 via the first network path 124, 126.

Thereafter, in block 604, the cyber recovery environment 106 writes the data from the virtual machine 104 to the plurality storage arrays 102a, 102b, 102c via the second network path 128.

Finally, in block 606, the cyber recovery environment 106 utilizes the second network path 128 over the fiber medium 128 to write the data from the virtual machine 104 to the logical unit number of the data on the plurality storage arrays 102a, 102b, 102c. Here, the second network path 128 unmounts the logical unit number (LUN) of the data from the virtual machine 104. Thereafter, the second network path 128 transfers and mounts that same logical unit number (LUN) of the data on the storage array 102 and/or the storage arrays 102a, 102b, and 102c. This causes the storage array 102 and/or the storage arrays 102a, 102b, and 102c to call, identify, and/or have access to the pertinent data. As such, the second network path 128 transfers the data without moving the source data itself, but by updating and moving the logical unit number (LUN) of the data as described above.

Figure 7:
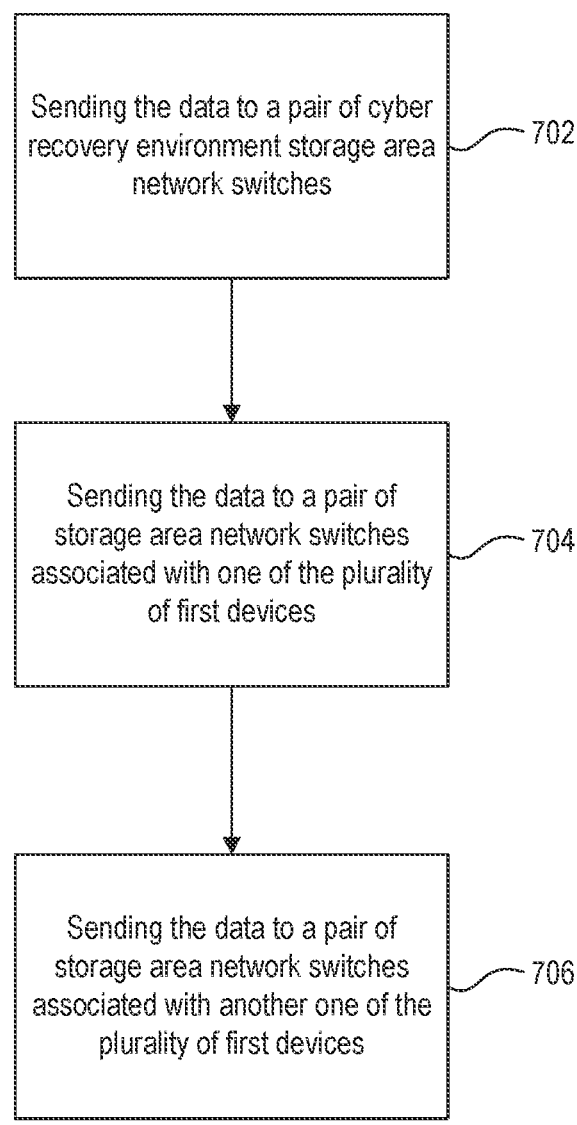
FIG. 7 illustrates a flowchart of an exemplary instantiating recovery of data using storage snapshots to the data production environment (DPE), consistent with disclosed embodiments.

FIG. 7 illustrates a flowchart of an exemplary instantiating recovery of data using storage snapshots to the data production environment (DPE), consistent with disclosed embodiments. The system 100 may carry out the instantiating recovery of data using storage snapshots to the data production environment (DPE) process of FIG. 7.

As seen in FIG. 7, in block 702, the cyber recovery environment 106 sends the data to a pair of cyber recovery environment storage area network switches 108.

Thereafter, in block 704, the cyber recovery environment 106 sends the data to a pair of storage area network switches 110 associated with one 116 of the plurality of first devices 116, 118. For example, as seen in FIG. 1, the cyber recovery environment 106 transfers the storage snapshots via the pair of CRE storage area network switches 108 to the first device 116 via the DPE storage area network switch 110.

Finally, in block 706, the cyber recovery environment 106 sends the data to a pair of storage area network switches 112 associated with another 118 of the plurality of first devices 116, 118. For example, as seen in FIG. 1, the cyber recovery environment 106 transfers the storage snapshots via the pair of CRE storage area network switches 108 to the first device 118 via the DPE storage area network switch 112.

Figure 8:
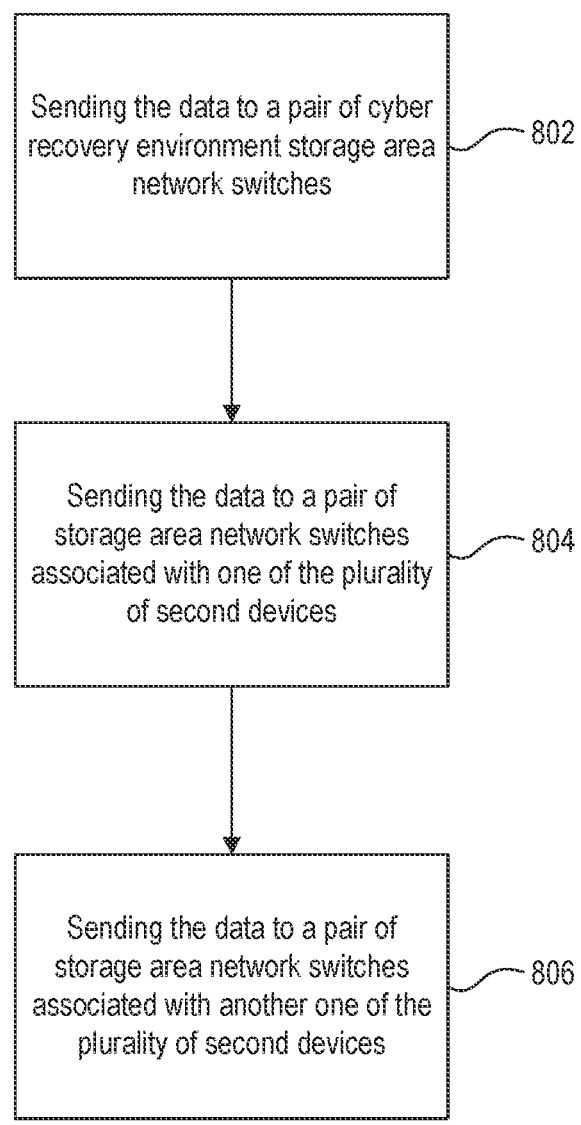
FIG. 8 illustrates a flowchart of an exemplary instantiating recovery of data using storage snapshots to the virtual recovery environment (VRE), consistent with disclosed embodiments.

FIG. 8 illustrates a flowchart of an exemplary instantiating recovery of data using storage snapshots to the virtual recovery environment (VRE), consistent with disclosed embodiments. The system 100 may carry out the instantiating recovery of data using storage snapshots process to the virtual recovery environment (VRE) of FIG. 8.

As seen in FIG. 8, in block 802, the cyber recovery environment 106 sends the data to a pair of cyber recovery environment storage area network switches 108.

Thereafter, in block 804, the cyber recovery environment 106 sends the data to a pair of storage area network switches 114 associated with one 120 of the plurality of second devices 120, 130. For example, as seen in FIG. 1, the cyber recovery environment 106 transfers the storage snapshots via the pair of CRE storage area network switches 108 to the second device 120 via the VRE storage area network switch 114.

Finally, in block 806, the cyber recovery environment 106 sends the data to a pair of storage area network switches 132 associated with another 130 of the plurality of second devices 120, 130. For example, as seen in FIG. 1, the cyber recovery environment 106 transfers the storage snapshots via the pair of CRE storage area network switches 108 to the second device 130 via the VRE storage area network switch 132.

Figure 9:
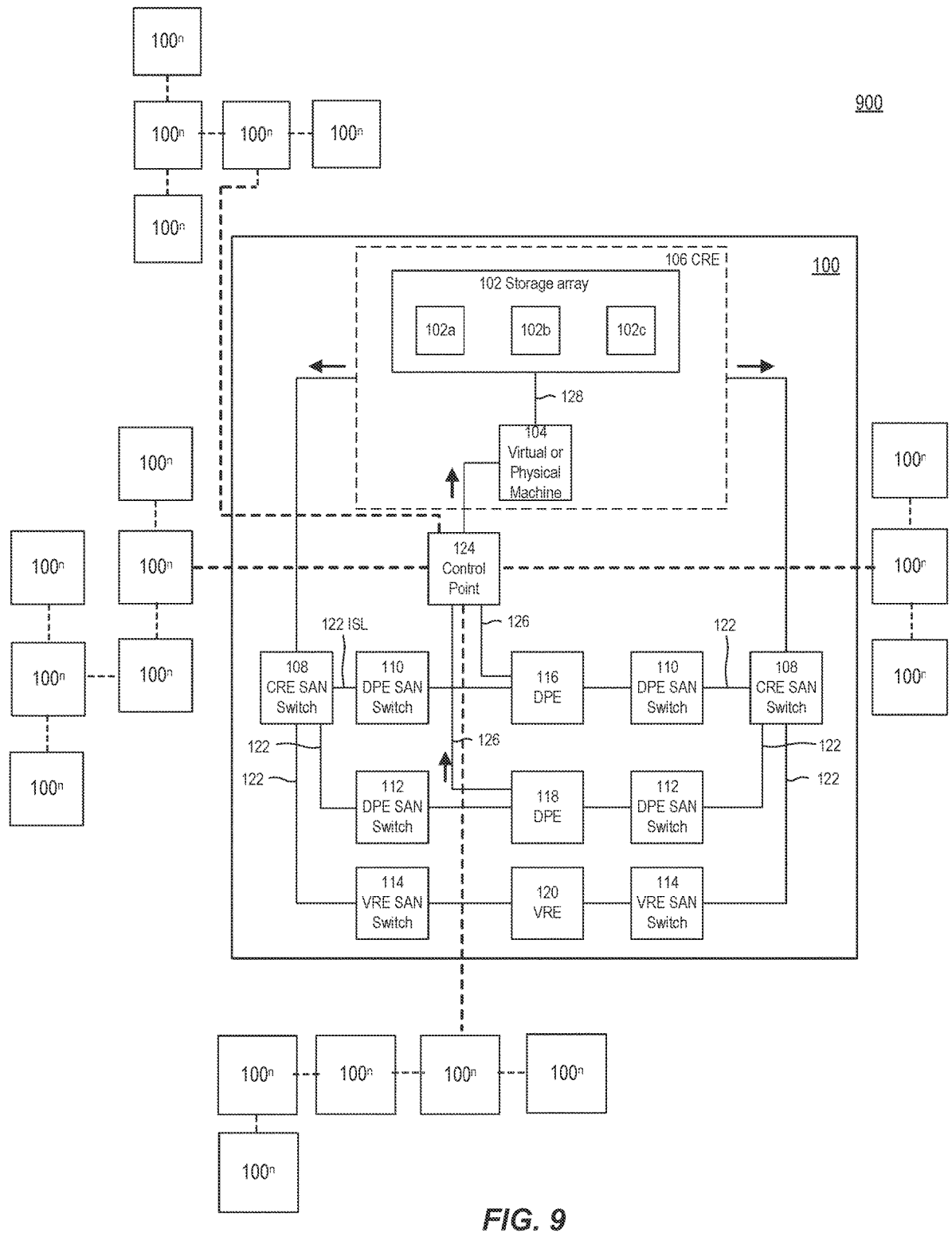
FIG. 9 illustrates a block diagram of an exemplary system for data recovery and backup comprising multiple vaults and/or sites wherein each vault and/or site may comprise a cyber recovery environment (CRE), a data production environment (DPE), and a virtual recovery environment (VRE), consistent with disclosed embodiments.

It is noted that the system 100 of FIG. 1 may be scaled as an overall solution to multiple vaults, sites, and/or environments beyond the CRE 106, the DPE 116, 118, and the VRE 120, 130, as need be. This may be seen especially in FIG. 9. FIG. 9 illustrates a block diagram 900 of an exemplary system for data recovery and backup, comprising multiple connected vaults 100″ at a plurality of sites. In some embodiments, each depicted vault 100″ may comprise a cyber recovery environment (CRE), a data production environment (DPE), or a virtual recovery environment (VRE), consistent with disclosed embodiments. Indeed, FIG. 9 illustrates and demonstrates the scalability of the system 100.

As depicted in FIG. 9, system 100 may be scalable and may be extended to connect with multiple vaults 100″. FIG. 9 depicts extension of system 100 in a variety of directions, including separate groups of vaults 100″ in multiple directions. The particular arrangement of these groups of vaults is not restrictive and is merely exemplary. Herein, the system 100 may connect to a plurality of vaults 100″ at a plurality of different sites and/or in a plurality of groups. Moreover, as seen in FIG. 9, each vault 100″ may be connected to another vault 100″ in any of the aforementioned direction(s), as need be. It is noted that both the number(s) of vaults 100″ and the direction(s) of extensions of vaults 100″ shown in FIG. 9 are exemplary and not constrictive and/or binding. Such a scalability feature enables extension of system 100 via the use of multiple vaults 100″ as need be. Moreover, such a scalability feature may allow the vendor(s) to utilize an appropriately-catered data recovery solution(s) for data recovery and data backup. This, in turn, allows for the versatility of the system 100 as well as an increased adaptability and customizability.

It will be apparent to persons skilled in the art that various modifications and variations can be made to the disclosed structure. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A method for efficient data recovery and backup, comprising:
storing data using storage snapshots, from a plurality of first devices, on a plurality of storage arrays via a first network path and a second network path,
determining a condition of data loss, power loss, or a cyber compromise event,
based on determining the condition, instantiating recovery of data using the storage snapshots from the plurality of storage arrays via a third network path, wherein instantiating recovery of data comprises sending the data to a plurality of second devices for scrubbing, analysis, and cleaning.

2. The method of claim 1, wherein the plurality of first devices is associated with a data production environment.

3. The method of claim 1, wherein storing data using storage snapshots comprises:
continuously sending the data from the plurality of first devices to a virtual machine associated with a cyber recovery environment via the first network path.

4. The method of claim 3, wherein the first network path comprises an air gapped first network medium and a control point.

5. The method of claim 3, wherein storing data using storage snapshots comprises:
writing the data from the virtual machine to the plurality of storage arrays via the second network path, wherein the second network path comprises a second network medium.

6. The method of claim 5, wherein storing data using storage snapshots comprises:
utilizing the second network medium to write the data from the virtual machine to logical unit number (LUN) of the data on the plurality of storage arrays.

7. The method of claim 1, wherein instantiating recovery of data further comprises:
sending the data to the plurality of first devices via a pair of cyber recovery environment storage area network switches.

8. The method of claim 7, wherein instantiating recovery of data further comprises:
sending the data from the pair of cyber recovery environment storage area network switches to a pair of storage area network switches associated with one of the plurality of the first devices.

9. The method of claim 8, wherein instantiating recovery of data further comprises:
sending the data from the pair of cyber recovery environment storage area network switches to a pair of storage area network switches associated with another one of the plurality of the first devices.

10. The method of claim 1, wherein instantiating recovery of data further comprises:
sending the data to the plurality of second devices via the pair of cyber recovery environment storage area network switches to a pair of storage area network switches associated with one of the plurality of the second devices.

11. The method of claim 10, wherein instantiating recovery of data further comprises:
sending the data to the plurality of second devices via the pair of cyber recovery environment storage area network switches to a pair of storage area network switches associated with another one of the plurality of the second devices.

12. The method of claim 1, wherein the plurality of storage arrays stores the data in a read-only manner to make the data immutable.

13. A system comprising:
a memory storing instructions, and
a process configured to execute the instructions to perform operations comprising:
storing data using storage snapshots, from a plurality of first devices, on a plurality of storage arrays via a first network path and a second network path,
determining a condition of data loss, power loss, or a cyber compromise event,
based on determining the condition, instantiating recovery of data using the storage snapshots from the plurality of storage arrays via a third network path,
wherein instantiating recovery of data comprises sending the data to a plurality of second devices for scrubbing, analysis, and cleaning.

14. The system of claim 13, wherein the plurality of first devices is associated with a data production environment.

15. The system of claim 13, wherein the system further comprises a cyber recovery environment comprising the plurality of storage arrays, a virtual machine, and a pair of storage area network switches.

16. The system of claim 15, wherein storing data using storage snapshots comprises:
continuously sending the data from the plurality of first devices to the virtual machine via the first network path.

17. The system of claim 16, wherein storing data using storage snapshots comprises:
utilizing the second network path over a fiber medium to write the data from the virtual machine to a logical unit number (LUN) of the data on the plurality of storage arrays.

18. The system of claim 15, wherein the first network path comprises an air gapped ethernet network and a control point.

19. The system of claim 15, wherein instantiating recovery of data further comprises:
sending the data from the pair of cyber recovery environment storage area network switches to a pair of storage area network switches associated with one of the plurality of the first devices.

20. The system of claim 14, wherein instantiating recovery of data further comprises:
sending the data to the plurality of second devices via the pair of cyber recovery environment storage area network switches to a pair of storage area network switches associated with one of the plurality of the second devices.

21. A method for efficient data recovery and backup, comprising:
storing data using storage snapshots, from a plurality of first devices, on a plurality of storage arrays via a first network path and a second network path,
determining a condition of data loss, power loss, or a cyber compromise event,
based on determining the condition, instantiating recovery of data using the storage snapshots from the plurality of storage arrays via a third network path, wherein instantiating recovery of data comprises:
sending the data to the plurality of first devices via a pair of cyber recovery environment storage area network switches; and
sending the data from the pair of cyber recovery environment storage area network switches to a pair of storage area network switches associated with one of the plurality of the first devices.

22. The method of claim 21, wherein the plurality of first devices is associated with a data production environment.

23. The method of claim 21, wherein storing data using storage snapshots comprises:
continuously sending the data from the plurality of first devices to a virtual machine associated with a cyber recovery environment via the first network path.

24. The method of claim 23, wherein the first network path comprises an air gapped first network medium and a control point.

25. The method of claim 23, wherein storing data using storage snapshots comprises:
writing the data from the virtual machine to the plurality of storage arrays via the second network path, wherein the second network path comprises a second network medium.

26. The method of claim 25, wherein storing data using storage snapshots comprises:
utilizing the second network medium to write the data from the virtual machine to a logical unit number (LUN) of the data on the plurality of storage arrays.

27. The method of claim 21, wherein instantiating recovery of data further comprises:
sending the data from the pair of cyber recovery environment storage area network switches to a pair of storage area network switches associated with another one of the plurality of the first devices.

28. The method of claim 21, wherein instantiating recovery of data further comprises:
sending the data to a plurality of second devices for scrubbing, analysis, and cleaning.

29. The method of claim 28, wherein instantiating recovery of data further comprises:
sending the data to the plurality of second devices via the pair of cyber recovery environment storage area network switches to a pair of storage area network switches associated with one of the plurality of the second devices.

30. The method of claim 29, wherein instantiating recovery of data further comprises:
sending the data to the plurality of second devices via the pair of cyber recovery environment storage area network switches to a pair of storage area network switches associated with another one of the plurality of the second devices.

31. The method of claim 21, wherein the plurality of storage arrays stores the data in a read-only manner to make the data immutable.

32. A system comprising:
a memory storing instructions, and
a process configured to execute the instructions to perform operations comprising:
storing data using storage snapshots, from a plurality of first devices, on a plurality of storage arrays via a first network path and a second network path,
determining a condition of data loss, power loss, or a cyber compromise event,
based on determining the condition, instantiating recovery of data using the storage snapshots from the plurality of storage arrays via a third network path, wherein instantiating recovery of data comprises:
sending the data to the plurality of first devices via a pair of cyber recovery environment storage area network switches; and
sending the data from the pair of cyber recovery environment storage area network switches to a pair of storage area network switches associated with one of the plurality of the first devices.

33. The system of claim 32, wherein the plurality of first devices is associated with a data production environment.

34. The system of claim 32, wherein the system further comprises a cyber recovery environment comprising the plurality of storage arrays, a virtual machine, and a pair of storage area network switches.

35. The system of claim 34, wherein storing data using storage snapshots comprises:
continuously sending the data from the plurality of first devices to the virtual machine via the first network path.

36. The system of claim 35, wherein storing data using storage snapshots comprises:
utilizing the second network path over a fiber medium to write the data from the virtual machine to a logical unit number (LUN) of the data on the plurality of storage arrays.

37. The system of claim 34, wherein the first network path comprises an air gapped ethernet network and a control point.

38. The system of claim 34, wherein instantiating recovery of data further comprises:
sending the data to a plurality of second devices for scrubbing, analysis, and cleaning.

39. The system of claim 38, wherein instantiating recovery of data further comprises:
sending the data to the plurality of second devices via the pair of cyber recovery environment storage area network switches to a pair of storage area network switches associated with one of the plurality of the second devices.

* * * * *

UNITED STATES PATENT AND TRADEMARK OFFICE
CERTIFICATE OF CORRECTION

PATENT NO. : 12,282,395 B2
APPLICATION NO. : 18/119722
DATED : April 22, 2025
INVENTOR(S) : Nathan G. Welshans et al.

Page 1 of 1

It is certified that error appears in the above-identified patent and that said Letters Patent is hereby corrected as shown below:

In the Claims

Claim 6, Column 18, Line 32, "to logical unit number" should read --to a logical unit number--.

Signed and Sealed this
Seventeenth Day of June, 2025

Coke Morgan Stewart
*Acting Director of the United States Patent and Trademark Office*